United States Patent Office 3,077,554
Patented Feb. 12, 1963

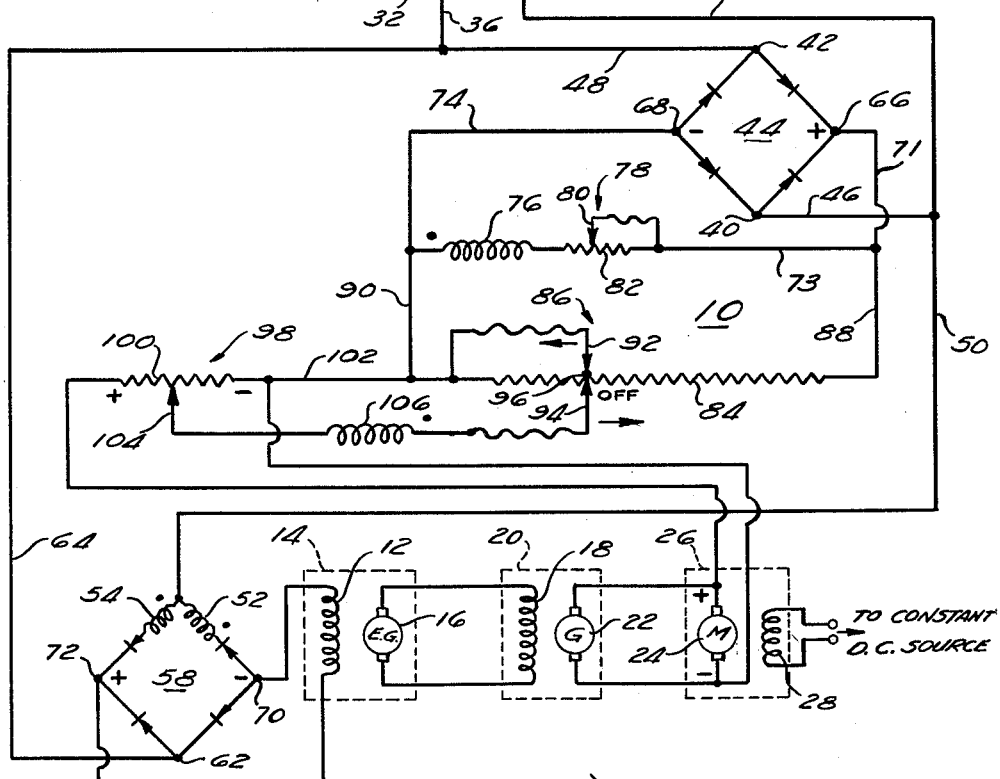
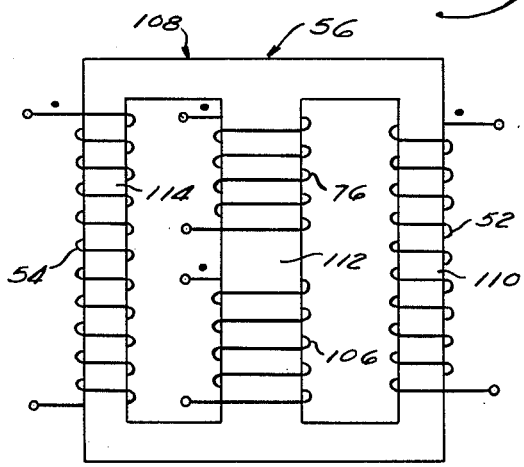
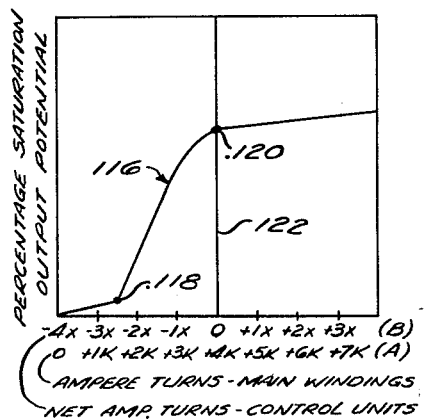

3,077,554
VARIABLE SPEED ELECTROMOTIVE
DRIVE SYSTEM
Wayne P. Stephens, Springfield, Ohio, assignor to The
White Motor Company, Cleveland, Ohio, a corporation
of Ohio
Filed Mar. 2, 1959, Ser. No. 796,464
4 Claims. (Cl. 318—145)

This invention relates to a variable speed electromotive drive system of the type employing a variable output generator for controllably energizing a drive motor and more particularly it relates to control circuit means including a saturable core reactor for controlling excitation of the generator field in accordance with speed requirements of the motor to achieve quick and effective speed control of the motor.

It will be observed that this invention is readily adaptable for use in controlling motors used in many different applications. However, for purposes of simplicity and clarity, the same will be described with reference to its particular applicability as a control unit for motors utilized in oil well drilling rigs for the different operations and functions necessary in such use.

In oil well drilling it is necessary, of course, to position the drill with relation to the ground into which it is to drill and to maintain the drill in position as it penetrates during drilling. Inasmuch as such drills are made of relatively heavy material such as steel to be durable enough to withstand the rugged use to which they are subjected and since they extend to lengths of a mile or more beneath the earth's surface, power is required for raising, lowering and maintaining these drill shafts in position over a wide range of speeds and torques. In addition a drilling table is provided which effectively couples a power source to the drill for rotating the same. For such purposes, power over a wide range of speeds and torques is also required. A sand reel requiring power over a wide range of speeds, but at somewhat lower and less critical torques, is utilized, and lastly a cat shaft is utilized for tightening and loosening pipe joints and for various other utility operations. For such purposes it is advantageous to drive the cat shaft at one of several preselected relatively low and fairly constant speeds.

Thus, there are four primary operations in such a drilling operation and a single motor is adaptable under proper control for each operation. Since operation of the motor at different speeds for different operation becomes intermittently and frequently necessary, it is important and advantageous to effect a change in speed of the motor from one operation to the speed for the next operation as quickly as possible to conserve useful time. In particular, due to the large moment of inertia of the drive motor, it is important to quickly reduce the motor speed to catheading speeds after operation at higher speeds for other operations.

It has been the usual practice in systems of the type herein considered, to reduce motor speed by dynamic breaking. In such systems for change in speed from operation at some speed considerably in excess of catheading speed, the generator excitation is changed by the control circuitry to provide a generated output voltage corresponding to the catheading speed of the motor. The motor which has a tendency to reduce speeds slowly due to its large moment of intertia of its armature, coasts at a speed which generates a counter electromotive force in the motor armature that exceeds the generator output voltage. Thus, because of the continuous electrical coupling between motor and generator, the generator becomes an electrical load for the motor, which decelerates rapidly at first due to the great difference in generated output potentials of the generator and motor but progressively decelerates more slowly as the motor speed reduces and the difference in generator output potential decreases.

In accordance with features of my invention described and claimed in my U.S. patent application, Ser. No. 742,915, filed, June 18, 1958, and assigned to the same assignee as the present invention, provision is made for improved motor control in accordance with the teachings therein. In accordance with the present invention still further improvement and simplification of the above described systems is achieved. As a feature of my present invention forming the subject matter of this application, the improved control of an electromotive drive system is even further simplified and utilizes a bare minimum of moving circuit elements such as switches and relays. To facilitate such improvement, power is supplied to the field winding of an excitation generator through the main windings of a saturable core reactor in series with a rectifier to supply the excitation power for the excitation generator of the system and the flow of current in these windings is controlled by controlling the reactance thereof in accordance with the magnitude of the magnetic flux in the core as controlled by control windings of the saturable core reactor.

Accordingly, it is a primary object of my invention to provide in a system as hereinabove described, an improved motor control circuit facilitating more effective dynamic breaking and quicker change in speeds of a versatile motor utilized intermittently for different functions.

It is another object of my invention to facilitate complete motor control with a simplified, effective and more reliable circuit utilizing a minimum of moving parts such as relay switches and mechanical linkages.

Other and further objects and advantages of my invention will become apparent from a perusal of the following detailed description thereof taken in conjunction with the accompanying drawings in which:

FIGURE 1 represents schematically the motor control circuit of my invention,

FIGURE 2 represents schematically the details of a saturable core reactor incorporated in the circuit of my invention, and FIGURE 3 shows a graph illustrating the magnetic circuit characteristics of the saturable core reactor shown in FIGURE 2.

Referring now to FIGURE 1 of the drawings, 10 represents generally the entire control circuit of my invention for regulating the flow of current through the field winding 12 of an excitor generator 14, the armature 16 of which is connected across the field coil 18 of a power supply generator 20. The armature 22 of the generator 20 is connected across the armature 24 of a drive motor 26 having a field winding 28 separately excited by a source of constant direct potential not shown. For rotatively driving the armatures 16 and 22 of generators 14 and 20, any suitable source of power such as an internal combustion engine, not shown, may be provided. In the usual case, a mobile engine that may be taken into an oil field is required although stationary power sources may be utilized in stationary control systems. Thus, under the control of circuit 10 as hereinbelow fully described, excitor generator 14 controls the excitation of power generator 20 to control the electrical power supplied to the motor 26. Accordingly, the speed of motor 26 is controlled by circuit 10.

For operating the several components of control circuit 10, a source of commercially available alternating voltage power is supplied through lines 27 and 30 to respective current limiting circuit breakers 32 and 34 to a pair of lines 36 and 38. The alternating potential at lines 36 and 38 is applied across diagonals 40 and 42 of a full wave bridge rectifier 44 through respective lines 46 and 48. A line 50 connects line 38 to the ends of main windings 52 and 54 of a saturable core reactor 56 shown in detail in FIGURE 2, the other ends of which windings are connected to rectifier elements in the respective legs of a full wave bridge rectifier circuit 58. The terminal 62 of rectifier 58 is connected to line 36 through a line 64. Accordingly, diagonal terminals 66 and 68 of rectifier 44 have applied thereacross a direct potential, positive at terminal 66 with respect to terminal 68 and diagonal terminals 70 and 72 of rectifier 58 have applied thereacross a direct potential positive at terminal 72 with respect to terminal 70. These polarities are indicated on the drawing by appropriate symbols.

The direct potential derived across terminals 70 and 72 is applied across field winding 12 of excitor generator 14 and a direct potential derived at terminals 66 and 68 of rectifier 44 is applied through respective lines 71, 73 and 74 across a series connection of control winding 76 of saturable core reactor 56 and a potentiometer 78 having a movable arm 80 for contacting the resistance element 82 thereof. This direct potential is also applied to the ends of the resistance element 84 of a potentiometer 86 through respective lines 88 and 90 connected to respective lines 71 and 74. Potentiometer 86 is provided with a pair of arms 92 and 94 movable in directions indicated by arrows for contacting the resistant element along portions thereof, from a reference position indicated 96 and labeled "off" for reasons to be explained hereinbelow. A further potentiometer 98 is provided with one end of its resistance element 100 connected across the output of generator 20 and connected at one end to line 90 through a line 102. A control arm 104 is provided which is movable for contact along any portion of the resistant element 100. A second control winding 106 of saturable core reactor 56 is connected across the potentiometer arms 94 and 104.

The arrangement of windings 52, 54, 76 and 106 of saturable core reactor 56 are disposed as shown in FIG. 2 of the drawings wherein magnetic core 108 comprises three parallel branches 110, 112 and 114 of the magnetic circuit thereof. Coil 52 is wound around branch 110, coil 54 is wound around branch 114 and coils 76 and 106 are wound around branch 112.

The coils of reactor 56 are wound so that they produce a magnetic flux that is north at the dotted end of each coil and south at the undotted end by current flowing through the winding in response to a potential positive at the dotted end and negative at the undotted end. Thus, the fluxes of any two or more windings are additive in response to the simultaneous passage of current through the windings from dotted ends to undotted ends or simultaneous passage of current from undotted to dotted ends since the fluxes produced by coils 52 and 54 flow in closed loops through the respective branches 110 and 114 and in each case such closed loop includes branch 112. The fluxes produced by coils 76 and 106, however, distribute evenly in closed loops through branches 110 and 114. Also, the fluxes of two windings are in opposition in response to current flowing from dotted end to undotted end in one and from undotted end to dotted end in the other of the windings. For purposes of simplicity and convenience, the direction of current flow in a winding from dotted to undotted end will herein be referred to as the "magnetizing" direction and current flow in a reverse direction will be referred to as being in a "demagnetizing" direction.

As observed in FIG. 3 of the drawings, the magnetic circuit of reactor 56 is constructed to have a saturation characteristic according to the curve 116. Thus, in response to current through windings of the reactor producing the respective net values of ampere turns of magnetomotive force from 0 to 7K of all coils plotted along the abscissa scale A wherein K is in some constant multiple, the percentage of saturation produced in the reactor core is as plotted on the ordinate of the graph.

As noted, the extent of saturation remains at a very low value for ampere turns of net magnetomotive force from 0 to .118 on the curve, then increases nearly linearly with increase in ampere turns of net magnetomotive force to .120 beyond which point very little added saturation can take place in the core.

The inductive reactance of the coils of the reactor are greatest over portions of curve 116 to the left of .118 as seen in FIG. 3 and from .118 to .120, as the saturation increases the inductive reactance of the windings correspondingly increases and from .120 on the curve to the right as seen in FIG. 3 the inductive reactance falls to a very low value by reason of the high degree of saturation.

As a consequence of the foregoing, the current in windings 52 and 54 varies in accordance with curve 116 since this curve represents the impedance to flow in the coils. Thus, since the output potential of the system depends on the degree of excitation of the excitation generator and generator coils 12 and 18, the output potential and motor speed is also represented by the curve 116 as indicated by the ordinate legend in FIG. 3.

Maximum output occurs near and beyond .120 on curve 116. By reason of the magnetizing effect of current in coils 52 and 54 alone during normal operation of the drive system, the core becomes saturated at .120. The control coil 76 and 106 under these circumstances are deenergized. However, these coils may be energized to affect the extent of magnetization of the core 108 either in an additive sense or in opposition to the magnetomotive force produced by windings 52 and 54. Thus, the magnetomotive force in the core 108 may be varied about the point 120 and to indicate the effect of such modifying magnetomotive force, abscissa scale B represents the control coil magnetomotive force produced by current in the control coils. The line 122 represents a value of zero control magnetomotive force and points to the left of this line as seen in FIG. 3 represent values of net control magnetomotive force that is in opposition to the magnetomotive force at main windings 52 and 54 while points to the right of 122 represent values of net control magnetomotive force that is additive with the magnetomotive force of the main windings. Thus, it is observed that by control of the current through the control windings, the output of the system generators and motor may readily be controlled. As a practical matter to desaturate the core 108 it is necessary only to pass current through one or both control coils from the undotted to the dotted end since under all conditions of operation the main windings pass current only from the undotted to the dotted ends thereof.

For an understanding of the operation of the invention, reference is made to FIG. 1 of the drawings and it is assumed that alternating potential power is supplied to lines 27 and 30 and that circuit breakers 32 and 34 are closed and further that the system is in an initial condition wherein arms 92 and 94 are in the "off" position, and that the motor 24 is at standstill. Potentiometer arm 80 is positioned to pass a value of current through winding 76 in a demagnetizing direction of substantially 3K units of the graph in FIG. 3 whereby the output potential of the system is at a very low value.

For hoisting operation with the potentiometer arm 80 preset as indicated, the arm 94 is moved along resistor 84 toward line 88 whereby the potential across winding 106 is increased in a direction to pass a magnetizing current therethrough. The demagnetizing effect of winding 76 is overcome to the extent that the current in winding 106 is increased. As the generator output potential is increased, the fraction thereof applied across the portion of the resistor 100 of potentiometer 98 from arm 104 to line 102, is in opposition to the potential derived across the portion of resistor of potentiometer 86 from "off" position to arm 94. The arm 104 is positioned, however, so that the potential derived from potentiometer 86 exceeds the mentioned fraction of generator potential and the speed of the motor increases in accordance with the magnitude of this differential potential. Thus, the speed of the motor is controllable by the movement of arm 94.

For catheading operations and assuming the initial conditions of the circuit as hereinabove set forth, arm 92 of potentiometer 86 is moved along potentiometer resistor 84 toward line 90 whereby again a potential is applied across winding 106 in a polarity as to pass a magnetizing current therethrough. As the generator potential increases, a fraction thereof is applied across the portion of potentiometer resistor 100 from arm 104 to line 102, in opposition to the portion between arms 92 and 94 on potentiometer 86. However, the potential derived from potentiometer 86 exceeds that derived at potentiometer 98 whereby a net value effects magnetization of core 108 and a motor 24 is driven. The different catheading speeds may be derived by the position of arm 92 along resistor 84.

It is next assumed that the motor is utilized for catheading operations and that intermittently it is necessary to operate the motor at different high speeds for other operations. Under these circumstances arm 92 is preset at some catheading speed position along potentiometer resistor 84, intermediate to "off" position and line 102. Thus, the motor operates at a catheading speed. For increased speed for a temporary operation, arm 94 is moved along potentiometer resistor 84 toward line 88 thus increasing the potential difference between arms 92 and 94 whereby the generator output potential and motor speed increased correspondingly. As before, a fraction of the generator output potential appears across the portion of potentiometer resistor 100 from arm 104 and line 102 in opposition to the potential derived at resistor 84. At the completion of the temporary operation, arm 94 which may be spring biased to "off" position is returned to the "off" position. Under these circumstances, the rotational inertia of motor 24 generates a counter electromotive force of a polarity at its terminals, the same as the generator applied potential. The counter electromotive force of motor 24 is of a value proportional to the rotational speed of its armature and initially may be of a considerable magnitude. A proportion of this potential is applied across a portion of potentiometer resistor 100 and thus across winding 106 in opposition to the potential derived by catheading arm 92 and in a direction to demagnetize the core 108. At speeds above catheading speed the counter electromotor force exceeds the potential determined at arm 92. Accordingly, a demagnetizing current flows into winding 106 and the saturation of the core is either decreased or the core becomes desaturated depending on the motor speed, in either of which cases the impedance to flow in windings 52 and 54 is increased to an extent corresponding to the desaturation and the output potential of the excitor generator 14 and generator 20 decreases correspondingly. The counter electromotive force of motor 24 is then dissipated in the armature winding of generator 20 to effect a dynamic braking of the motor.

As motor 24 reduces speed, the counter electromotive force thereof correspondingly decreases and the braking gradually decreases until the motor speed corresponds to the preset catheading speed as determined by the position of arm 92.

It is thus seen that the dynamic braking of motor 24 is automatically effected on the return of arm 94 to "off" position. The rsponse to the dynamic braking feature may be controlled by the position of arm 104 along resistor 100 thus controlling the fraction of generator output voltage applied to the potentiometer resistor 100. By applying a greater proportion of the counter electromotive force of motor 24 to winding 106, a greater braking effect is achieved whereby the motor reverts to present catheading speed in less time.

Thus, the invention provides a control system for use in a variable speed electromotive drive system wherein the speed of a motor is controlled by varying the voltage applied to the field winding of an excitor generator which controls the main generator supplying electrical power to the motor. The control system includes a magnetic amplified type of saturable core reactor for controlling the voltage supply to the field winding of the excitor generator.

The magnetic amplifier 56 is of the self-saturating type and includes two main, or load, windings 52, 54 and two control windings 76, 106 wound around its core structure 108. The load windings 52, 54 control the voltage supply to the field winding 12 of the excitor generator 16. The first control winding 76 is energized by a predetermined voltage set by the potentiometer 78 to produce a magnetomotive force in the core 108 which opposes that produced by the load windings and biases the saturable core 108 to a relatively de-saturated state. The second control winding 106 is energized by a combination of a voltage across the motor terminals and a variable control voltage provided by the potentiometer 86. When the motor 24 is running the voltage across its terminals is connected in series opposition to the variable control voltage. If the variable control voltage exceeds the motor terminal voltage, the second control winding 106 is energized to produce a magnetomotive force in the saturable core in aiding relation to that produced by the load windings.

The electromotive drive system is placed in operation by moving either of the sliding arm contacts 92, 94 of potentiometer 86 away from the OFF position so that a variable control voltage appears across the second control winding 106. As there is no voltage across the motor terminals at this time, the entire variable control voltage is applied to the second control winding 106. The second control winding drives the saturable core 108 towards saturation decreasing the impedance of the load windings 52, 54 and thereby increasing the voltage applied to the field winding of the excitor generator. The excitor generator 16 energizes the field winding of the main power supply generator 22 which in turn supplies electrical energy to the motor 24. The motor, 24 after being energized, comes up to a speed determined by the setting of the movable contact arms 92, 94. The voltage now appearing across the motor terminals opposes the variable control voltage, and as the motor comes up to speed the voltage across the second control winding 106 decreases to a small, marginal amount necessary to maintain a steady-state condition.

The speed of the motor 24 is increased by increasing the variable control voltage setting to where the variable control voltage is again greater than the motor terminal voltage. The voltage difference energizes the second control winding to drive the saturable core further into saturation. The impedance of the load windings decreases further and the voltage supplied to the motor by the main power supply generator increases. As the motor increases its speed the voltage appearing across its terminals again approaches the variable control voltage and a steady state condition is reestablished.

When the variable control voltage is set at a lower value to decrease the speed of the motor the voltage appearing across the motor terminals will be greater than the variable control voltage. The current through the second control winding reverses and the magnetomotive force produced by it opposes that of the load windings to drive the saturable core toward desaturation. Thus, the impedance of the load windings increases to decrease the voltage applied to the field winding of the excitor generator. The excitor generator produces less excitation for the main power supply generator which results in a decrease in the voltage supplied to the motor terminals. As the motor decelerates the generator acts as a load to dynamically brake the motor until the counter-emf generated by the motor is less than the variable control voltage setting at which time the system again reaches a steady-state condition. At this point the generator is supplying power to the motor so that the latter runs at a speed determined by the variable control voltage setting.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim as new and desire to secure by Letters Patent of the United States is:

1. A variable speed electromotive drive system comprising a motor having an armature, a main power supply generator having an armature connected in series loop with the motor armature to supply electrical power thereto, an exciter generator including a field winding having output terminals connected to the field winding of said main power supply generator to control the voltage output thereof, a saturable core means including a load winding means and a first and second control winding means, said load winding means controllably connecting the field widing of said exciter generator to an energy source and producing a predetermined value of magnetomotive force in said saturable core means, said first control winding means being energized to produce a magnetomotive force in opposition to the magnetomotive force produced by said load winding means to bias said saturable core means to a relatively de-saturated state, a control potentiometer connected across a voltage supply and having a first and second variable tap positioned intermediate the ends thereof to provide an Off position, said first variable tap being connected to one end of said potentiometer, said first variable tap being positionable along the potentiometer from said off position toward the end to which it is connected to provide a predetermined controlling voltage for causing the motor to run at a low and predetermined speed, said second variable tap being positionable along said potentiometer away from said Off position to provide a selective controlling voltage in addition to said predetermined controlling voltage for causing said motor to run at a higher and selectively variable speed, said second control winding means being responsive to the motor armature voltage and said predetermined and selective controlling voltages to produce a magnetomotive force in said saturable core means in additive relation to the magnetomotive force produced by said load winding means when said controlling voltages exceed said motor armature voltage to drive said saturable core means toward a saturated state, the degree of saturation of said core being directly related to the amount the sum of said controlling voltages, exceed said motor armature voltage, said second control winding means producing a magnetomotive force in said saturable core means in opposition to the magnetomotive force produces by said load winding means when said motor armature voltage exceeds said controlling voltages to deenergize the field winding of said main power supply generator and dynamically brake said motor until said controlling voltages again exceed said armature voltage where said motor runs at the lower speed determined by said controlling voltages.

2. A variable speed electromotive drive system comprising a motor having an armature, a main power supply generator having an armature connected in series loop with the motor armature to supply electrical power thereto, an exciter generator having a field winding and output terminals, said output terminals being connected to the field winding of said main power supply generator to control the voltage output thereof, a saturable core control means including load winding means and a first and second control winding means, said load winding means controlling the voltage supplied to the field winding of said exciter generator, said first control winding means being energized to produce a magnetomotive force in opposition to the magnetomotive force produced by said load winding means to bias said saturable core means to a relatively de-saturated state, first circuit means connected to said motor armature to produce a sample voltage proportional to the motor armature voltage, second circuit means producing a two-step controlling voltage, said second circuit means including a control potentiometer having a first and second variable tap positioned intermediate the ends thereof to provide an Off position, said first variable tap being positionable along the potentiometer from the Off position toward the end to which it is connected to establish the first step of said controlling voltage at a first predetermined value, said second variable tap being positionable along said potentiometer away from said Off position to establish the second step of said controlling voltage at a value variable from said first predetermined voltage to a second higher voltage, said second control winding means of said saturable core means being connected to said first circuit means and said second circuit means so that said second control winding means is connected across the sample voltage in series opposition to the two-step controlling voltage so that when the controlling voltage exceeds the sample voltage said second control winding produces a magnetomotive force in said saturable core means in opposition to that produced by said first control winding means to cause said saturable core to be driven towards saturation reducing the impedance of said load winding means to increase the voltage supplied to the field winding of the exciter generator, the degree of saturation being directly related to the controlling voltage, and when said sample voltage exceeds said controlling voltage said second control winding means produces a magnetomotive force in said saturable core means in additive relation to that produced by said first control winding means to desaturate said saturable core means to shut off said main power generator to dynamically brake said motor until said controlling voltage again exceeds said sample voltage where said motor again runs at a lower speed determined by said controlling voltage.

3. A variable speed electromotive drive system comprising a motor having an armature, a main power supply generator having an armature connected in series loop with the motor armature so as to supply electrical power thereto, an exciter generator having a field winding and output terminals, said output terminals being connected to the field winding of said main power supply generator to control its voltage output, a saturable core means including load winding means and a first and second control winding means, said load winding means controlling the voltage supplied to the field winding of said exciter generator, said first control winding means being energized to produce a magnetomotive force in opposition to the magnetomotive force produced by the load winding means to bias said saturable core means to a relatively desaturated state, first circuit means connected to said motor to provide a sample voltage proportional to the motor armature voltage, second circuit means providing a variable control voltage, said second circuit means including a potentiometer having a first and second variable tap positioned intermediate the ends thereof to provide an Off position, said first variable tap being positionable along said potentiometer from said Off position to provide a predetermined portion of said variable control voltage for causing said motor to run at low and predetermined speed, said second variable tap being positionable along said potentiometer to provide a selective portion of said variable control voltage in addition to said predetermined portion for causing the motor to run at a higher and selectively variable speed, said control voltage appearing between said second variable tap and an end of said potentiometer, said first variable tap being connected to one end of said potentiometer, said first circuit means being connected to said second circuit means so that said sample voltage is in series opposition to said variable control voltage, said second control winding being connected across the series connection of said sample voltage and said variable control voltage so that said saturable core means turns on said main power supply generator when said variable control voltage exceeds said sample voltage and turns off said main power supply generator to effect dynamic braking of said motor when said sample voltage exceeds said variable control voltage until said control voltage again exceeds said sample voltage where said motor resumes running at the lower speed set by the variable taps.

4. A control circuit for a variable speed motor where an exciter generator controls the output voltage of the main power supply generator supplying power to the variable speed motor comprising a field winding for the exciter generator, a magnetic amplifier having two load windings and first and second control windings, said load windings being connected to the field winding of said exciter generator and to an energy source to control the degree of energization of said field winding, said first control winding being connected to an energy source to bias said magnetic amplifier to a relatively de-saturated state, a first potentiometer including a variable tap, said first potentiometer being connected across said variable speed motor, a second potentiometer including first and second contact arms, said first contact arm being connected to one end of said second potentiometer, said second potentiometer being connected across a power source, said first potentiometer being connected in series with said second potentiometer so that the voltage appearing across said second potentiometer opposes that appearing across said first potentiometer when said variable speed motor is drawing power from said main power supply generator, said second control winding of said magnetic amplifier being connected between the variable tap of said first potentiometer and the second contact arm of said second potentiometer, said variable tap being set to energize the second control winding with a predetermined fraction of the voltage appearing across said first potentiometer, said first and second contact arms being set at the same point intermediate the ends of said second potentiometer to establish an Off position, said first contact arm establishing a preselected low and constant speed by being movable along the second potentiometer toward the end to which it is connected to energize said second control winding with a first predetermined voltage, said second contact arm establishing a relatively higher and variable speed by being movable along said second potentiometer in a direction opposite from said first contact arm to energize said second control winding with a second predetermined voltage, said second predetermined voltage having a maximum greatly in excess of said first predetermined voltage, said second control winding increasing the relative saturation of the magnetic amplifier when the sum of said first and second predetermined voltages exceeds the predetermined fraction of the voltage appearing across said first potentiometer, said second control winding decreasing the relative saturation of the magnetic amplifier when the sum of the first and second predetermined voltages is less than the predetermined fraction of the voltage appearing across said first potentiometer.

References Cited in the file of this patent
UNITED STATES PATENTS

| | | |
|---|---|---|
| 2,629,847 | Eames et al. | Feb. 24, 1953 |
| 2,675,518 | Morgan | Apr. 13, 1954 |
| 2,715,203 | Morgan | Aug. 9, 1955 |
| 2,733,307 | Ogle | Jan. 31, 1956 |
| 2,733,404 | Ogle | Jan. 31, 1956 |
| 2,740,086 | Evans et al. | Mar. 27, 1956 |
| 2,785,359 | King et al. | Mar. 12, 1957 |
| 2,830,249 | Peterson | Apr. 8, 1958 |
| 2,853,668 | Moore | Sept. 23, 1958 |